US011652626B2

(12) United States Patent
Powers et al.

(10) Patent No.: US 11,652,626 B2
(45) Date of Patent: May 16, 2023

(54) SAFEGUARDING CRYPTOGRAPHIC KEYS FROM MODIFICATION OR DELETION (71) Applicant: International Business Machines Corporation, Armonk, NY (US)

(72) Inventors: Eysha Shirrine Powers, Los Angeles, CA (US); David Z. Rossi, Millington, NJ (US); Robert Petti, Kerhonkson, NY (US); Kenneth Kerr, New Paltz, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 179 days.

(21) Appl. No.: 16/793,443

(22) Filed: Feb. 18, 2020

(65) Prior Publication Data
US 2021/0258157 A1 Aug. 19, 2021

(51) Int. Cl.
*H04L 9/08* (2006.01)
*G06F 16/23* (2019.01)
*G06F 21/62* (2013.01)

(52) U.S. Cl.
CPC ........ *H04L 9/0894* (2013.01); *G06F 16/2379* (2019.01); *G06F 21/6218* (2013.01)

(58) Field of Classification Search
CPC . G06F 16/2379; G06F 21/6218; H04L 9/0894
See application file for complete search history.

(56) References Cited

U.S. PATENT DOCUMENTS

| 6,363,387 B1* | 3/2002 | Ponnekanti ......... G06F 16/2308 |
| 8,145,916 B2* | 3/2012 | Boshra ................. H04L 9/3231 |
| | | 382/128 |
| 8,271,783 B2* | 9/2012 | Ibrahim ................ G06F 21/57 |
| | | 713/166 |
| 8,634,561 B2* | 1/2014 | Arnold ................ H04L 9/0897 |
| | | 380/278 |
| 9,071,429 B1* | 6/2015 | Roth .................... H04L 9/0894 |

(Continued)

FOREIGN PATENT DOCUMENTS

| CN | 106533694 A | 3/2017 |
| KR | 20020086444 A | 11/2002 |

OTHER PUBLICATIONS

Tahir et al., "A Novel Private Cloud Document Archival System Architecture Based on ICMetrics", 2013 Fourth International Conference on Emerging Security Technologies, 2013, pp. 102-106.

(Continued)

*Primary Examiner* — Gary S Gracia
(74) *Attorney, Agent, or Firm* — Cantor Colburn LLP; Teddi Maranzano (57) ABSTRACT

Aspects of the invention include generating a cryptographic key to restrict access to a resource. The cryptographic key being defined by a key token. An exemplary method includes designating a storage field in metadata of the key token, in metadata of a cryptographic key data set record that includes the key token, or in a resource access control database that controls use of the cryptographic key for inclusion of an indicator that the cryptographic key may or may not be deleted or modified. The indicator in the designated storage field is set to indicate whether or not the cryptographic key may be deleted or modified.

14 Claims, 4 Drawing Sheets

(56) References Cited

U.S. PATENT DOCUMENTS

| | | | |
|---|---|---|---|
| 9,530,021 B2* | 12/2016 | Otsuka | G06F 21/74 |
| 9,881,173 B2* | 1/2018 | Hazlewood | H04L 9/0819 |
| 10,116,440 B1* | 10/2018 | Rudzitis | H04L 9/0891 |
| 10,204,236 B1* | 2/2019 | Tang | H04L 9/0894 |
| 10,425,225 B1* | 9/2019 | Grubin | H04L 9/0643 |
| 10,474,831 B1* | 11/2019 | Volkanov | G06F 21/6218 |
| 11,042,522 B2* | 6/2021 | Tian | G06F 16/221 |
| 11,240,023 B1* | 2/2022 | Donlan | H04L 9/088 |
| 2002/0026578 A1* | 2/2002 | Hamann | H04L 9/3263 713/159 |
| 2007/0113078 A1* | 5/2007 | Witt | G06F 21/602 713/165 |
| 2008/0115078 A1* | 5/2008 | Girgaonkar | G06F 3/0489 715/773 |
| 2008/0244721 A1* | 10/2008 | Barrus | H04L 9/0819 726/9 |
| 2009/0307277 A1* | 12/2009 | Grubov | G06F 11/1451 707/999.203 |
| 2010/0174919 A1* | 7/2010 | Ito | G06F 21/74 713/192 |
| 2010/0232607 A1* | 9/2010 | Nimura | G06F 21/62 380/279 |
| 2011/0307724 A1* | 12/2011 | Shaw | G06F 21/34 713/323 |
| 2012/0275596 A1* | 11/2012 | Ureche | H04L 9/0822 380/47 |
| 2012/0281836 A1* | 11/2012 | Arnold | H04L 9/088 380/277 |
| 2015/0046712 A1* | 2/2015 | Korkishko | H04L 9/3234 713/170 |
| 2015/0074408 A1* | 3/2015 | Oberheide | H04L 9/083 713/171 |
| 2017/0230179 A1* | 8/2017 | Mannan | H04L 9/3226 |
| 2017/0366547 A1* | 12/2017 | Goldfarb | H04L 63/10 |
| 2017/0373843 A1* | 12/2017 | Benson | H04L 9/3234 |
| 2018/0026969 A1* | 1/2018 | Newton | H04L 63/0823 713/176 |
| 2018/0241561 A1* | 8/2018 | Albertson | H04L 63/06 |
| 2018/0300717 A1* | 10/2018 | Haque | H04L 9/3213 |
| 2018/0336554 A1* | 11/2018 | Trotter | H04L 63/0853 |
| 2019/0058587 A1* | 2/2019 | Roth | H04L 9/0894 |
| 2019/0114115 A1* | 4/2019 | Wille | G06K 19/0723 |
| 2019/0213179 A1* | 7/2019 | McHugh | G06F 16/1873 |
| 2021/0143990 A1* | 5/2021 | Ruane | H04L 9/0891 |
| 2021/0258157 A1* | 8/2021 | Powers | H04L 9/0894 |
| 2022/0209946 A1* | 6/2022 | Simon | G06F 21/57 |

OTHER PUBLICATIONS

International Search Report and Written Opinion for PCT Application No. PCT/IB2021/051022, dated May 17, 2021, pp. 1-9.

* cited by examiner

SAFEGUARDING CRYPTOGRAPHIC KEYS FROM MODIFICATION OR DELETION

BACKGROUND

The present invention generally relates to cryptographic keys, and more specifically, to safeguarding cryptographic keys from modification or deletion.

Cryptographic keys are used to encrypt data to thwart breaches and comply with industry regulations. Data encryption keys (i.e., cryptographic keys) are used to read and write encrypted data, which is data that is altered by an encryption algorithm according to the key. The key is a string of data that determines the functional output of the algorithm. The same or different cryptographic keys can be used to write and read data. Cryptographic keys can be designed as single-use or long term keys.

SUMMARY

Embodiments of the present invention are directed to safeguarding cryptographic keys from modification or deletion. A non-limiting example computer-implemented method includes generating a cryptographic key to restrict access to a resource. The cryptographic key is defined by a key token. The method also includes designating a designated storage field in metadata of the key token, in metadata of a cryptographic key data set record that includes the key token, or in a resource access control database that controls use of the cryptographic key for inclusion of an indicator that the cryptographic key may or may not be deleted or modified. The indicator in the designated storage field is set to indicate whether or not the cryptographic key may be deleted or modified.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

As previously noted, cryptographic keys facilitate generating encrypted data from input data. A cryptographic key is required to recover the input data from the encrypted data. Without the correct cryptographic key, the encrypted data is unreadable. While cryptographic keys for certain applications can be single-use keys, others are long term keys. These long term keys may need to be retained for decades. The duration for which some cryptographic keys need to be retained raises concerns about inadvertent or malicious deletion or modification of cryptographic keys.

One prior approach has involved an administrator enabling cryptographic key usage tracking to determine if a key is still in use. However, a given cryptographic key could be protecting data that was encrypted prior to tracking being enabled or data that is now archived and offline, which would appear not to be in use. In this case, the usage tracking would not properly ensure retention of the cryptographic key. Another approach has involved the generation of a public or private key pair (i.e., a key encrypting key) to protect the cryptographic key. The cryptographic key is retained for the duration of this key encrypting key. However, this approach adds another key that must be tracked.

One or more embodiments of the present invention relate to safeguarding cryptographic keys from modification or deletion. Specifically, a storage field is established in direct association with the cryptographic key that must be retained. As further detailed herein, the storage field can be part of a key token, which is the metadata of the cryptographic key itself. According to an alternate embodiment of the invention, the storage field can be part of the metadata of a key store entry containing the key token. According to yet another alternate embodiment of the invention, the storage field can be part of the resource access control database that controls how the cryptographic key may be used. Once the storage field designating a key as permanent or safeguarded is established according to one of the exemplary embodiments of the invention, a program or application program interface (API) that provides access to the cryptographic key will issue a failure to a request to modify or delete the cryptographic key.

Figure 1:
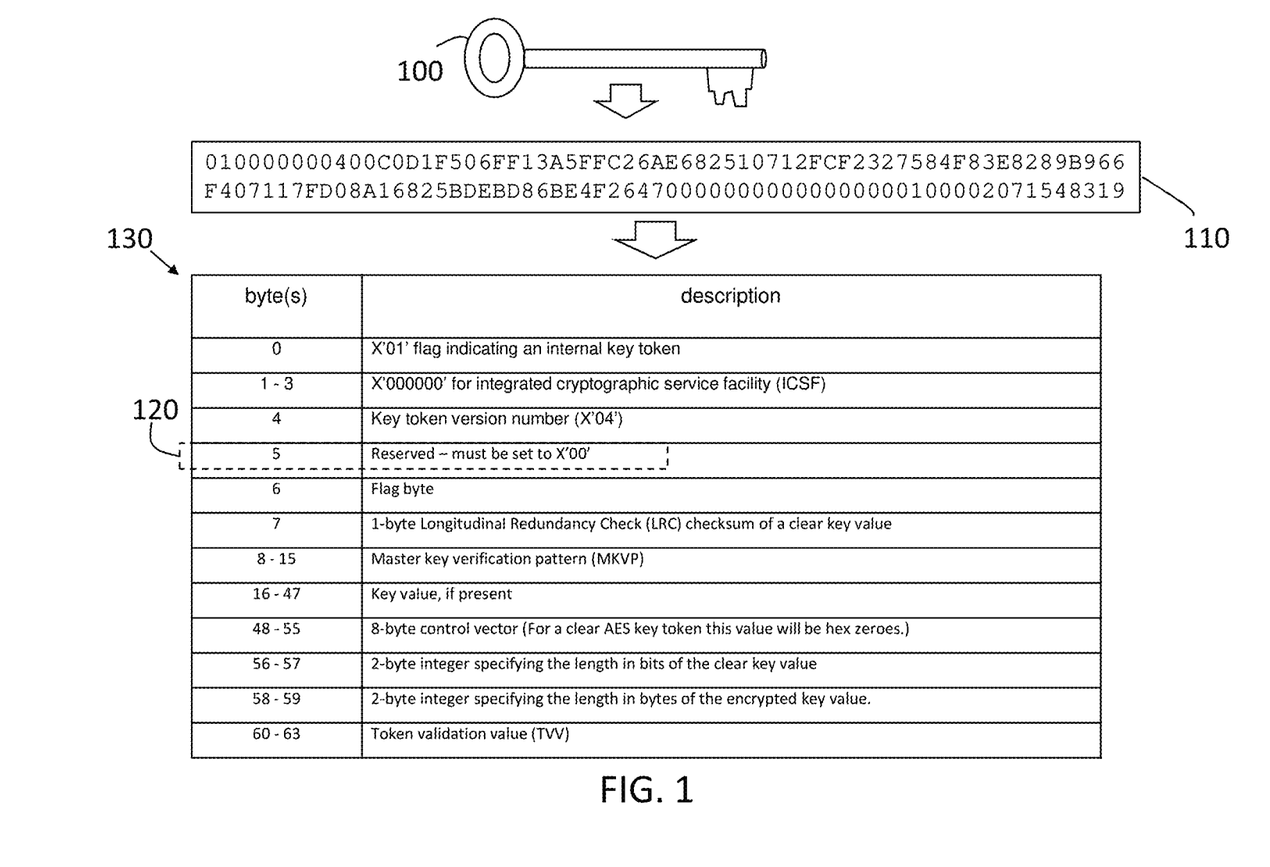
FIG. 1 depicts an exemplary fixed-length key token with an exemplary designated storage field to safeguard a cryptographic key from modification or deletion according to one or more embodiments of the invention.
Figure 4:
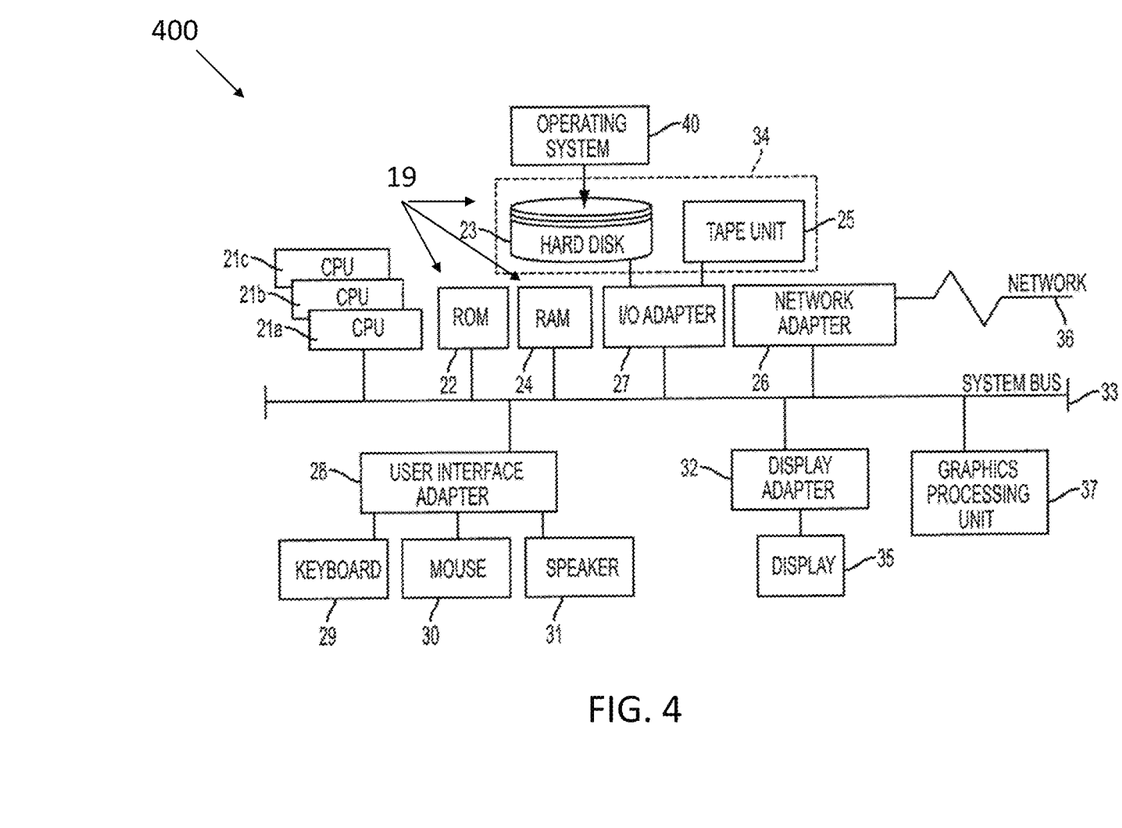
FIG. 4 depicts a block diagram of a processing system for storing and processing the designated storage fields described herein.

FIG. 1 depicts an exemplary fixed-length key token 110 with an exemplary designated storage field 120 to safeguard a cryptographic key 100 from modification or deletion according to one or more embodiments of the invention. As previously noted, the cryptographic key 100 can be used to control access to a resource (e.g., program, data). An attempt to access a resource that is encrypted with a cryptographic key 100 will fail if the correct cryptographic key 100 is not used. The key token 110, which defines the cryptographic key 100, may be generated and stored, for example in memory 19 of processing system 400 as shown in FIG. 4.

The exemplary key token 110 has a fixed length of 64 bytes, which are shown represented by 128 hexadecimal characters. Other lengths are also possible for the key token 110. The key token 110 is generated by an API or program based on specifications of the desired cryptographic key 100 and is the metadata of the cryptographic key 100 itself. An exemplary description of the 64 bytes is provided in the table 130. In FIG. 1, the byte at offset five is indicated as the exemplary designated storage field 120 that indicates that the cryptographic key 100 may not be deleted or modified. In alternate embodiments of the invention, other bytes (e.g., bytes 1-3) may be used for the designated storage field 120.

The indication that the cryptographic key 100 may not be deleted or modified may be added to the designated storage field 120 at the time that the cryptographic key 100 and, thus, the key token 110 defining the cryptographic key 100, are generated, at the time that a cryptographic key 100 is imported, or at any other time. If an attempt is made to delete or overwrite the cryptographic key 100, the designated storage field 120 is checked for inclusion of the indication. If the indication is, in fact, made in the designated storage field 120, the attempt to delete or overwrite the cryptographic key 100 will fail. The indication can be a flag (0=can delete or modify; 1=may not delete or modify), for example. Optionally, the key token 110 can be stored as part of a key record 230 in a data set (e.g., cryptographic key data set (CKDS) 210) as discussed with reference to FIG. 2.

Figure 2:
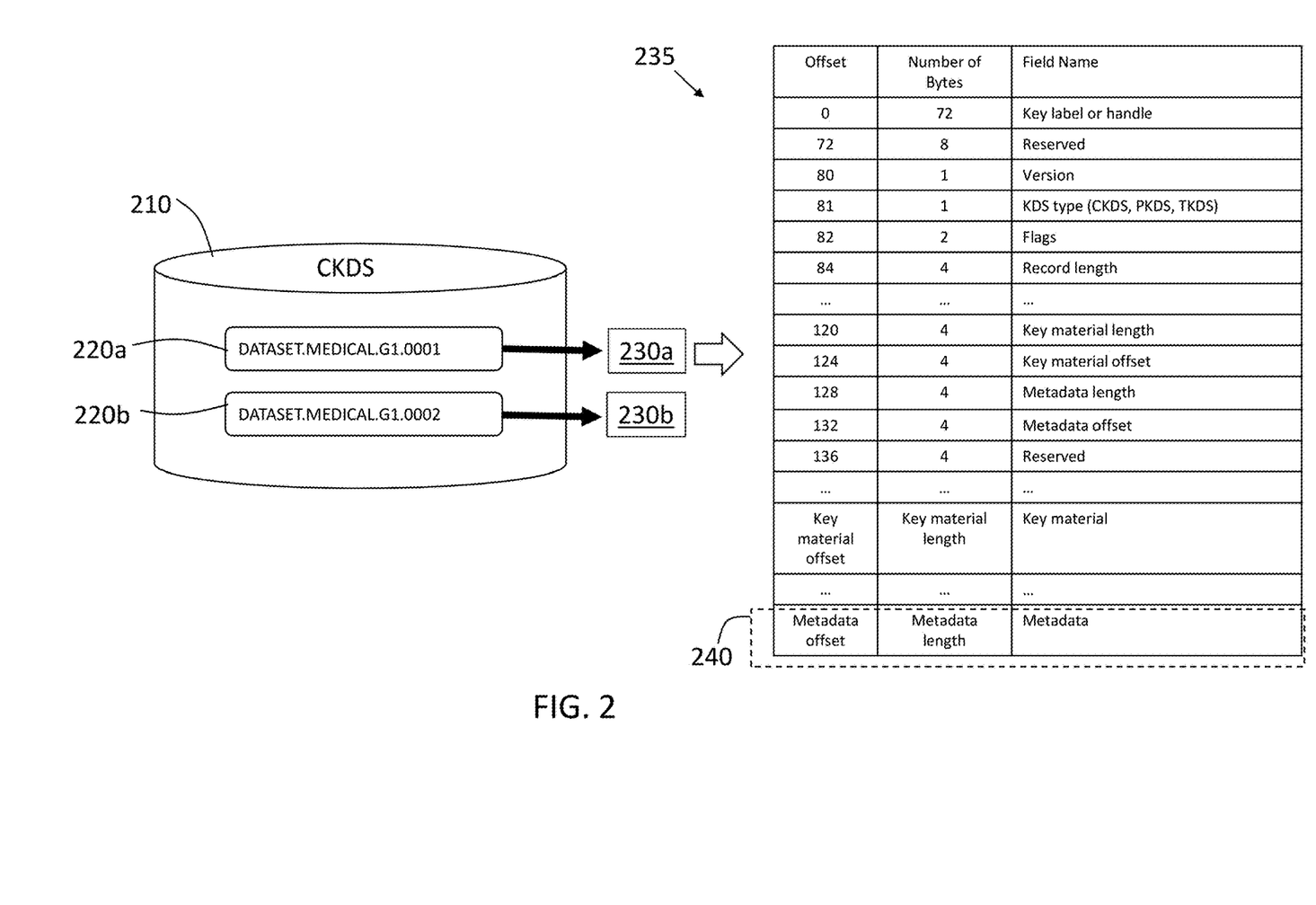
FIG. 2 shows an exemplary cryptographic key data set (CKDS) storing a key record with a designated storage field to safeguard a cryptographic key from modification or deletion according to one or more embodiments of the invention.

FIG. 2 shows an exemplary CKDS 210 storing a key record 230 with a designated storage field 240 to safeguard a cryptographic key 100 (FIG. 1) from modification or deletion according to one or more embodiments of the invention. The CKDS 210 can be stored in the memory 19 of the processing system 400 (FIG. 4), for example. In FIG. 2, the exemplary CKDS 210 is shown to store key labels 220a, 220b (generally referred to as 220). Each key label 220a, 220b is an index for a corresponding key record 230a, 230b (generally referred to as 230). Each key record 230 includes a key token 110 (FIG. 1) and metadata. The table 235 details the fields that make up the key record 230. As shown in FIG. 2, the metadata can include the designated storage field 240 to which an indication can be added that the cryptographic key 100, which is identified by the corresponding key label 220, may not be deleted or modified.

The indication that the cryptographic key 100 may not be deleted or modified may be added to the designated storage field 240 at the time that the particular key record 230 is created, at the time that the key record 230 is populated after obtaining the key token 110 defining the cryptographic key 100, or at any other time. As noted for the designated storage field 120, discussed with reference to FIG. 1, the designated storage field 240 is checked for inclusion of the indication (that the corresponding cryptographic key 100 may not be deleted or modified) if an attempt is made to delete or overwrite the cryptographic key 100. If the indication is, in fact, made in the designated storage field 240, the attempt to delete or overwrite the cryptographic key 100 will fail. The indication can be a flag (0=can delete or modify; 1=may not delete or modify), for example.

As previously noted, the storage of a key token 110 as part of a key record 230 is optional. Thus, according to an exemplary embodiment of the invention, a key token 110 can be stored by itself with a designated storage field 120. Alternately, a key token 110 with a designated storage field 120 can be stored in a key record 230. According to yet another alternative embodiment of the invention, a key token 110 can be stored in a key record 230 that includes a designated storage field 240.

Figure 3:
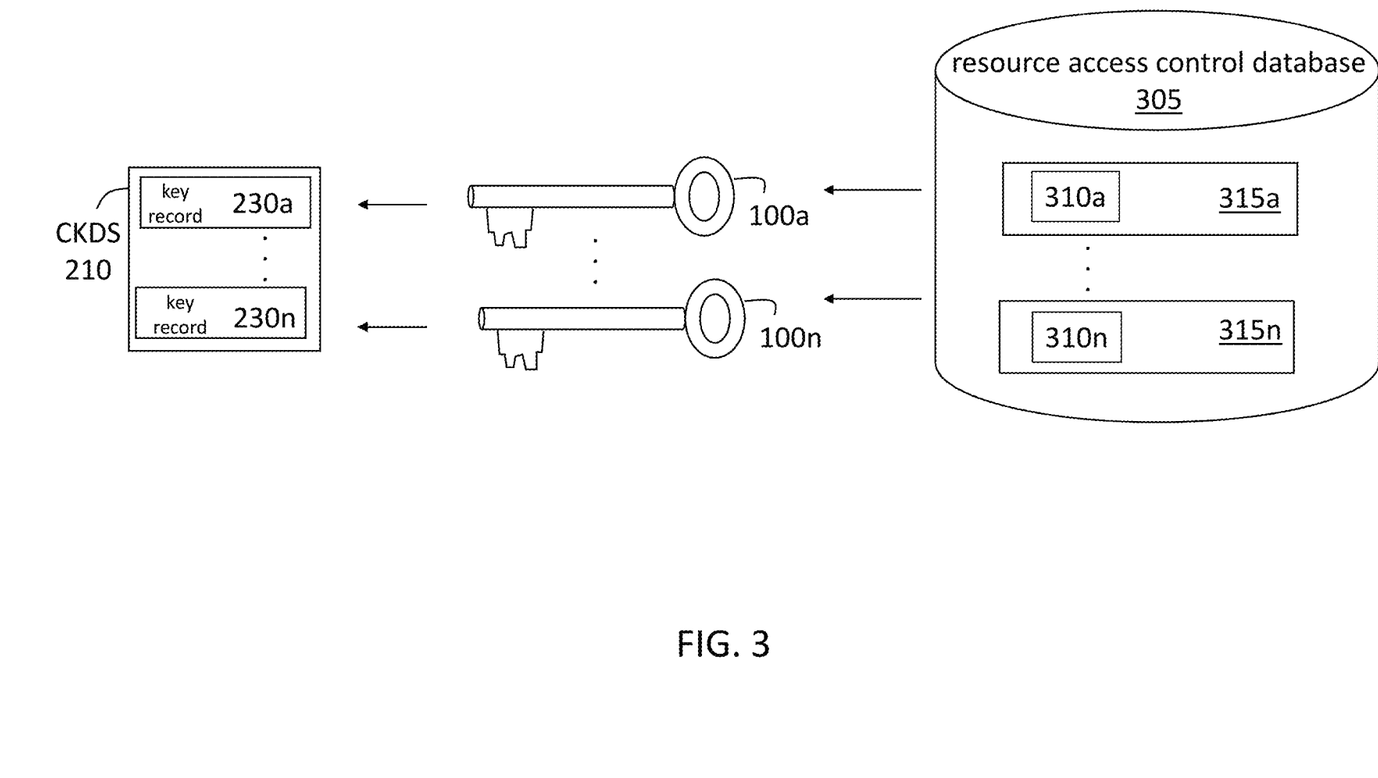
FIG. 3 shows an exemplary resource access control database with a designated storage field associated with each cryptographic key to safeguard against modification or deletion according to one or more embodiments of the invention.

FIG. 3 shows an exemplary resource access control database 305 with a designated storage field 310 associated with each cryptographic key 100 to safeguard against modification or deletion according to one or more embodiments of the invention. The resource access control database 305 includes profiles 315a through 315n (generally referred to as 315) corresponding, respectively, with cryptographic keys 100a through 100n (generally referred to as 100). As previously noted, each cryptographic key 100 may be defined by a key token 110 (FIG. 1), for example. As also previously noted with reference to FIG. 2, a CKDS 210 can store key records 230a through 230n (generally 230) corresponding with the keys 100a through 100n.

As discussed with reference to FIG. 1, metadata of a key token 110 defining a cryptographic key 100 can include a designated storage field 120. As discussed with reference to FIG. 2, metadata of a key record 230 can include a designated storage field 240. Alternately, metadata of the key token 110 that is part of the key record 230 can include the designated storage field 120. As FIG. 3 indicates, the profile 315 in the resource access control database 305 that corresponds with each cryptographic key 100 can include the designated storage field 310. The security controls stored in a profile 315 of the resource access control database 305 that dictate the use of a corresponding cryptographic key 100 can be implemented with processors 21 of the processing system 400 (FIG. 4), for example. The profiles 315, each including the designated storage field 310, can be stored in the memory 19 of the processing system 400.

The command used to set fields of the profiles 315 in the resource access control database 305 can be used to set the indication in the designated storage field 310 of corresponding with any number of cryptographic keys 100 associated with the resource access control database 305. That is, the indication in the designated storage field 310 of one, a set, or all of the profiles 315 can be set with a single command. The indication can be added in the designated storage field 310 at any time. The indication can be a flag (0=can delete or modify; 1=may not delete or modify), for example. If an attempt is made to delete or overwrite the cryptographic key 100 associated with a profile 315, the designated storage field 310 of the profile 315 is checked for inclusion of the indication that the cryptographic key 100 may not be deleted or modified. If the indication is, in fact, made in the designated storage field 310, the attempt to delete or overwrite the cryptographic key 100 will fail.

FIG. 4 depicts a block diagram of a processing system 400 for storing and processing the designated storage fields 120, 240, 310 described herein. In the embodiment shown in FIG. 4, processing system 400 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 400.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 400 can be stored in mass storage 34. The RAM 22, ROM 24, and mass storage 34 are examples of memory 19 of the processing system 400. A network adapter 26 interconnects system bus 33 with an outside network 36 enabling the processing system 400 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 400 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 400 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 400.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    obtaining, using a processor, a cryptographic key that restricts access to a resource, the cryptographic key being defined by a key token and being deletable or modifiable;
    designating, using the processor, a storage field in at least one of metadata of the key token, metadata of a cryptographic key data set record that includes the key token, and a resource access control database that controls use of the cryptographic key for inclusion of an indicator that the cryptographic key cannot be deleted or modified; and
    safeguarding the cryptographic key from subsequent modification or deletion by setting, using the processor, the indicator in the designated storage field, indicating the cryptographic key as a safeguarded key that cannot be deleted or modified, wherein an attempt to delete or modify the safeguarded key will fail;
    wherein the resource access control database includes two or more profiles that correspond, respectively, with two or more cryptographic keys, each profile having the designated storage field, and setting the indicator in the designated storage field includes setting the indicator in the designated storage field of each of the two or more profiles at once.

2. The computer-implemented method according to claim 1, further comprising storing the cryptographic key data set record in a cryptographic key data set.

3. The computer-implemented method according to claim 2, wherein the designating the storage field includes the storage field being in the metadata of the key token which is part of the cryptographic key data set record.

4. The computer-implemented method according to claim 1, wherein the setting the indicator includes setting a flag to indicate that the cryptographic key may or may not be deleted or modified.

5. The computer-implemented method according to claim 1, wherein the obtaining the cryptographic key to restrict access to the resource includes obtaining the cryptographic key to restrict access to a program or to data.

6. A system comprising:
    a memory having computer readable instructions; and
    one or more processors for executing the computer readable instructions, the computer readable instructions controlling the one or more processors to perform operations comprising:
    obtaining a cryptographic key that restricts access to a resource, the cryptographic key being defined by a key token and being deletable or modifiable;
    designating a storage field in at least one of metadata of the key token, metadata of a cryptographic key data set record that includes the key token, and a resource access control database that controls use of the cryptographic key for inclusion of an indicator that the cryptographic key cannot be deleted or modified; and
    safeguarding the cryptographic key from subsequent modification or deletion by setting the indicator in the designated storage field, indicating the cryptographic key as a safeguarded key that cannot be deleted or modified, wherein an attempt to delete or modify the safeguarded key will fail;
    wherein the resource access control database includes two or more profiles that correspond, respectively, with two or more cryptographic keys, each profile having the designated storage field, and setting the indicator in the designated storage field includes setting the indicator in the designated storage field of each of the two or more profiles at once.

7. The system according to claim 6, further comprising storing the cryptographic key data set record in a cryptographic key data set.

8. The system according to claim 7, wherein the designating the storage field includes the storage field being in the metadata of the key token which is part of the cryptographic key data set record.

9. The system according to claim 6, wherein the setting the indicator includes setting a flag to indicate that the cryptographic key cannot be deleted or modified.

10. The system according to claim 6, wherein the obtaining the cryptographic key to restrict access to the resource includes obtaining the cryptographic key to restrict access to a program or to data.

11. A computer program product comprising a computer readable storage medium having program instructions embodied therewith, the program instructions executable by a processor to cause the processor to perform operations comprising:
    obtaining a cryptographic key that restricts access to a resource, the cryptographic key being defined by a key token and being deletable or modifiable;
    designating a storage field in at least one of metadata of the key token, metadata of a cryptographic key data set record that includes the key token, and a resource access control database that controls use of the cryptographic key for inclusion of an indicator that the cryptographic key cannot be deleted or modified; and
    safeguarding the cryptographic key from subsequent modification or deletion by setting the indicator in the designated storage field, indicating the cryptographic key as a safeguarded key that cannot be deleted or modified, wherein an attempt to delete or modify the safeguarded key will fail;
    wherein the resource access control database includes two or more profiles that correspond, respectively, with two or more cryptographic keys, each profile having the designated storage field, and setting the indicator in the designated storage field includes setting the indicator in the designated storage field of each of the two or more profiles at once.

12. The computer program product according to claim 11, further comprising storing the cryptographic key data set record in a cryptographic key data set.

13. The computer program product according to claim 12, wherein the designating the storage field includes the storage field being in the metadata of the key token which is part of the cryptographic key data set record.

14. The computer program product according to claim 11, wherein the setting the indicator includes setting a flag to indicate that the cryptographic key cannot be deleted or modified.

* * * * *